2,891,090
PURIFICATION OF SALICYLIC ACID DERIVATIVES

John Robert Campbell, Webster Groves, Charles M. Eaker, Kirkwood, and Emory H. Kimball, Webster Groves, Mo., assignors to Monsanto Chemical Company, St. Louis, Mo., a corporation of Delaware No Drawing. Application December 30, 1954
Serial No. 478,884

5 Claims. (Cl. 260—474)

This invention relates to the purification of derivatives of salicylic acid and more specifically pertains to an improved process for the purification of derivatives of salicylic acid whereby colored impurities are removed and eliminated from derivatives of salicylic acid.

Derivatives of salicylic acid as prepared on an industrial scale sometimes contain colored impurities which not only detract from the appearance of the finished product, but also render the finished product unsatisfactory for its ultimate use since many of the ultimate uses of derivatives of salicylic acid require that the product be free from colored impurities. This is especially true in the case where derivatives of salicylic acid are used as a pharmaceutical such as in the case of salol (phenylsalicylate) or in the case of aspirin (acetylsalicylic acid). Colored impurities are also undesirable in phenylsalicylate when used as an ultraviolet absorption agent in protective oils, creams, and lotions employed to protect the skin from ultraviolet rays. When derivatives of salicylic acid are prepared on a laboratory scale in all glass equipment, the colored impurities do not appear in the final product. However, when derivatives of salicylic acid are prepared on the industrial scale where although most of the equipment is glass or glass-lined, there are, of course, some non-glass members, and colored impurities do appear.

Also industrially prepared derivatives of salicylic acid, especially those derivatives of salicylic acid which are ordinarily solids such as those derivatives having a melting point of above about 35° C., will not have a uniform discoloration throughout each and every crystal or particle of the product, but rather will have individual crystals that have an appearance of being from slightly dirty to almost black. Where the derivative of salicylic acid can be distilled, distillation appears to be of some help in eliminating the presence of these colored impurities. But ordinarily, it is impractical to purify solid derivatives of salicylic acid by distillation. Practically all these solid derivatives are recovered by crystallization processes and purified by recrystallization from various solutions. However, even after the solid derivatives of salicylic acid have been subjected to recrystallization, the final product still contains gray to almost black individual particles or crystals even though all practical precautions have been taken to eliminate contamination of the product's dark-colored impurities.

An improvement for the process for purifying derivatives of salicylic acid has now been discovered. This improvement comprises treating the derivatives of salicylic acid with a dilute aqueous solution of a water-soluble acid, preferably a non-toxic polybasic acid such as those used in foodstuffs as for example phosphoric acid, tartaric acid and citric acid. The process of this invention can be used in the purification of water-soluble as well as water-insoluble derivatives of salicylic acid. Obviously, when employing the process of this invention purifying water-soluble derivatives of salicylic acid, a portion of the derivative will be dissolved in the aqueous treated medium and produce an apparent loss in yield of the derivative being purified. This apparent loss can be overcome by treating the derivative of salicylic acid with an aqueous solution of rather high concentration of said water-soluble derivative also containing the small amount of the polybasic acid required to accomplish the removal and/or destruction of the colored impurities. Water-insoluble liquid and relatively low melting derivatives of salicylic acid can be treated by the process of this invention by adding the dilute aqueous solution of phosphoric acid as a water wash for the liquid or liquefied product. In addition, where the process of this invention is employed to purify water-insoluble derivatives of salicylic acid which are normally solid, the dilute aqueous solution of polybasic acid can be used to wash the crystalline product at any one of the recrystallizing steps but preferably is used as a wash for the crystalline product resulting from the last recrystallization step.

Also, a water-soluble normally solid derivative of salicylic acid can be treated by the process of this invention by recrystallizing the derivative from a solution in a water-miscible solvent by adding a dilute aqueous solution of the polybasic acid at or just prior to the time crystals begin to precipitate from the solvent solution. Where the process of this invention is carried out by adding the dilute aqueous solution of phosphoric acid to a solution of the derivative of salicylic acid, a water-miscible solvent, a sufficient amount of the dilute aqueous solution of phosphoric acid is added to provide sufficient water to promote substantially complete crystallization of the derivative being purified.

The most convenient and preferred water-soluble polybasic acids for use in the process of this invention are phosphoric, citric and tartaric acids. However, any of the other water-soluble polybasic acids can be employed where the salicylic acid derivative is not to be used for pharmaceutical preparations for internal use. The amount of phosphoric, citric or tartaric acids to be employed in the process of this invention will, of course, depend upon the amount of impurity present. However, in most cases where it is required to remove the impurities appearing as relatively small numbers of discolored crystals, it will be found that the use of no more than about 1% by weight of phosphoric, citric or tartaric acids will produce satisfactory results. The percentage by weight of the acid utilized being based upon the sum of the weights of the aqueous solution containing the acid and the derivative being treated where it is not in solution or the solution of the derivative. It will be readily understood by those skilled in the art that where much more of the colored impurities exist, larger amounts of the non-toxic water-soluble polybasic acid will be required. However, in treating the products resulting from well-controlled, regulated industrial processes for preparing derivatives of salicylic acid, it will be found that the amount of the non-toxic water-soluble polybasic acid to be used will be in the range of about 0.1% or less to 1% by weight based on the sum of the total weight of all materials employed in the step.

The process of this invention is not dependent upon the use of any particular derivative of salicylic acid, but rather can be employed with any derivative of salicylic acid as hereinbefore indicated. The problem of colored impurities appearing in the desired derivative of salicylic acid appears to be in part linked with the free salicylic acid content of the derivative rather than the nature of the particular derivative. However, free salicylic acid content of the derivative is apparently not the only cause of the presence of colored impurities for a salicylic acid derivative can have an acceptable low free salicylic acid content and still contain colored impurities. In this case, the colored impurities may have been caused by free salicylic acid reacting with some substance during the operation or some derivative causing the formation of a colored impurity. Regardless of the cause of the colored impurity, the process of this invention reduces the free salicylic acid content of the desired derivative even more than does the recrystallization process involving the use of a water-miscible solvent and the addition of cold water to the solution. The process of this invention also removes colored impurities present in a derivative of salicylic acid in the presence of or in the substantial absence of free salicylic acid.

Hence, the process of this invention can be used to purify but is not limited to the purification of the following derivatives of salicylic acid. Esters of salicylic acid such as methyl salicylate, ethyl salicylate, butyl salicylate, propyl salicylate, isopropyl salicylate, 2,4-dinitrobenzyl salicylate, tolyl salicylates, naphthyl salicylates, trisalicylin furfuryl salicylate, and cyclohexyl salicylate. Such ether derivatives such as methoxy salicylic acid, ethoxy salicylic acid, propoxy salicylic acid, benzoxy salicylic acid, phenoxy salicylic acid, isopropoxy salicylic acid, p-ethylphenoxy salicylic acid, and 2,4-dichlorophenoxy salicylic acid. Such acyl derivatives as acetyl salicylic acid, salicyl salicylic acid, phenacyl salicylic acid, benzoyl salicylic acid, and p-nitrobenzoyl salicylic acid. Such other derivatives as salol and its derivatives such as its methyl ester, ethyl ester, its phenoxy derivative p-nitrobenzoxy, acetyl derivative, benzoyl derivative, nicotinyl derivative. Such derivatives of aspirin such as methylacetyl salicylate, ethyl salicylate, phenyl salicylate, benzyl salicylate and others.

The following examples in which the term "parts" is employed to indicate parts by weight are illustrative of the process of this invention.

Example I

Floor sweeping from a packing room where dry acetyl salicylic acid is packaged is employed in the process of this invention. These sweepings are added to methanol in the proportion of 100 parts of methanol for each 100 parts of acetyl salicylic acid in the sweepings. Also, to the methanol there is added about 0.1 part of decolorizing charcoal such as "Norit A." The resulting mixture is heated to about 50° C. and held there for 30 minutes, filtered and permitted to cool to 45° C. whereupon cold water and phosphoric acid are added slowly with cooling to the methanol solution as crystals form. A total of about 170 parts of water containing 1.4 parts of $H_3PO_4$ are added to the methanol solution for each 100 parts of acetyl salicylic acid in solution. This is about 0.38% $H_3PO_4$ by weight based on the total weight of the methanol and water solutions. The resulting slurry is cooled to 15° C., filtered to remove the acetyl salicylic acid crystals which are washed with ice water and dried.

The dried acetyl salicylic acid, a yield of 93%, purified as described above was found to have a free salicylic acid content of 0.006% whereas the salicylic acid content of the acetyl salicylic acid before treatment was about 0.03 to 0.04%. An ethanol solution of the purified product has a color corresponding to an A.P.H.A. No. of 23, whereas that of the unpurified material was about 100 and the product being packed was about 50.

Example II

The process of Example I is repeated except that the cooling methanol solution is seeded at 45° C., about 0.67 part of phosphoric acid or 85% $H_3PO_4$ for each 100 parts of acetyl salicylic acid in solution are added, cold water is added to the cooling solution and then about 0.83 part of 85% $H_3PO_4$ is added for each 100 parts of salicylic acid when all the water had been added. The results of this purification process are substantially the same as obtained in Example I.

Example III

Wet technical grade of acetyl salicylic acid crystals, the product obtained by cooling in stainless steel equipment the reaction mixture resulting from the reaction of acidic anhydride with salicylic acid and glacial acetic acid are employed in the process of this invention. This technical grade crystalline product has a free salicylic acid content of 0.030% and a methanol solution of these crystals has a color corresponding to an A.P.H.A. No. of 12. There are combined in the following proportions: 100 parts of methanol and 0.1 part of decolorizing charcoal for each 100 parts of the above technical grade of crystals. This mixture is heated to about 50° C. for 10 minutes, filtered and then cooled. The cooling methanol solution is seeded with crystals of acetyl salicylic acid and then a cold aqueous solution containing 1% by weight of phosphoric acid is added thereto over a period of about one hour. After all the dilute phosphoric acid had been added, the resulting mixture is cooled to about 15° C., filtered and washed with ice water. The resulting crystalline product is dried and analyzed for free salicylic acid. The free salicylic acid content of the recovered product is found to be 0.018% in contrast to the free salicylic acid content of the product recovered in the recrystallizing process which did not involve the use of phosphoric acid. An ethanol solution of the product recovered according to the above process has a color corresponding to an A.P.H.A. No. of 6.

Example IV

Wet technical grade of acetyl salicylic acid crystals containing 300 to 500 dark crystals per pound and having a free salicylic acid content of about 0.04% is dissolved in methanol to form a 50% solution. The resulting solution is cooled to about 10° C. and a cold dilute aqueous solution containing about 1% by weight of tartaric acid is slowly added thereto while cooling. The resulting slurry is filtered, the filter cake washed with ice water and the recovered solids dried.

The free salicylic acid content of the recovered white product is less than 0.02% and there are no detectable dark crystals in the dried product.

Example V

Wet technical grade of acetyl salicylic acid crystals containing 300 to 500 dark crystals per pound and having a free salicylic acid content of about 0.04% is dissolved in methanol to form a 50% solution. The resulting solution is cooled to about 10° C. and a cold dilute aqueous solution containing about 1% by weight of citric acid is slowly added thereto while cooling. The resulting slurry is filtered, the filter cake washed with ice water and the recovered solids dried.

The free salicylic acid content of the recovered white product is less than 0.02% and there are no detectable dark crystals in the dried product.

Example VI

Wet crude salol (phenol salicylate) prepared by reacting salicyl chloride with sodium phenate in aqueous solution and washed with water is dissolved in a minimum quantity of methanol in a stainless steel vessel. The hot methanol solution is cooled and seeded with crystalline salol. As crystals form, a dilute cold aqueous solution of phosphoric acid is added to the methanol solution in a volume about equal thereto and containing sufficient phosphoric acid to provide a final mixture containing about 0.2% by weight of $H_3PO_4$. The resulting mixture is cooled to about 10° C., filtered and the purified salol dried. The resulting product when dissolved in ethanol has an A.P.H.A. No. of 6 whereas the corresponding product recovered from a process of recrystallization has a color in ethanol of about 20.

By employing the process described in Example VI, diplosal (salicyl salicylic acid) can also be purified. Also, methyl salicylate distilled in stainless steel equipment can be washed free from colored impurities by washing with an aqueous solution of phosphoric acid and then drying the washed ester. Salicylyl amide can also be purified with dilute aqueous phosphoric acid.

Although the process of this invention has been illustrated by means of specific examples, those skilled in the art will visualize other embodiments thereof. Hence, it is not desired that the process of this invention be limited solely to the illustrative examples but rather include all modification coming within the scope of the appended claims.

What is claimed is:

1. In the purification of a normally-solid derivative of salicylic acid by recrystallization from a solution thereof in a lower aliphatic alcohol, the steps comprising cooling said solution until crystals appear and then adding to the solution a dilute aqueous solution of a polybasic acid selected from the group consisting of citric acid, tartaric acid, and an acid of phosphorus.

2. In the purification of a normally-solid derivative of salicylic acid by recrystallization from a solution thereof in methanol, the steps comprising cooling said solution until crystals appear and then adding to the solution a dilute aqueous solution of phosphoric acid.

3. In the purification of acetyl salicylic acid by recrystallization from a solution thereof in methanol, the steps comprising cooling said solution until crystals appear and then adding to the solution a dilute aqueous solution of phosphoric acid containing sufficient water to provide substantially complete crystallization of said acetyl salicylic acid.

4. In the purification of acetyl salicylic acid by recrystallization from a solution thereof in methanol, the steps comprising cooling said solution until crystals appear and then adding to the solution, water and phosphoric acid, the amount of water added being sufficient to provide substantially complete crystallization of said acetyl salicylic acid, and the amount of phosphoric acid added being up to about 1% of the total weight of said solution and added water.

5. In the purification of phenyl salicylate by recrystallization from a solution thereof in methanol, the steps comprising cooling said solution until crystals appear and then adding to the solution, water and phosphoric acid, the amount of water added being sufficient to provide substantially complete crystallization of said phenyl salicylate, and the amount of phosphoric acid added being up to about 1% of the total weight of said solution and added water.

References Cited in the file of this patent

UNITED STATES PATENTS

| | | |
|---|---|---|
| 671,769 | Lederer | Apr. 9, 1901 |
| 2,209,019 | Slagh | July 23, 1940 |
| 2,248,112 | Neustein | July 8, 1941 |
| 2,731,492 | Kamlet | Jan. 17, 1956 |